United States Patent Office 2,950,212
Patented Aug. 23, 1960

2,950,212
PROCESS FOR MANUFACTURING BINDING AGENTS

Paul Christiaan van der Willigen, Eindhoven, Netherlands, assignor to North American Philips Company Inc., New York, N.Y., a corporation of Delaware No Drawing. Filed Apr. 8, 1957, Ser. No. 651,170
Claims priority, application Netherlands, Apr. 11, 1956

4 Claims. (Cl. 106—286)

It has been suggested that gels of alkaline-earth fluoride and more particularly the fluorides of calcium, magnesium and strontium, could be manufactured from a dispersion thereof in a polar liquid, such as water, by adding to this dispersion potential-determining ions, so that the surface charge of the dispersed particles is increased and in this condition gel is produced.

Potential-determining ions, by which these fluorides are converted into the gel state, are cations of the dispersed substance or cations which can substitute the first-mentioned at the surface of the particles or in the crystal lattice of the substance of which the particles are made up. As an example of compounds containing potential-determining ions in solution are mentioned: chlorides of calcium, magnesium, zinc, strontium, cadmium and barium and furthermore magnesium nitrate.

By suitable choice of the amount of water in which an alkaline-earth fluoride powder is dispersed, treacle-like liquids to vaseline-like products are obtained, from which the water may be evaporated and which may advantageously be used as a binder for powdered constituents intended for adhering together objects, providing powdery layers on, for example, glass, ceramic or metal and similar applications.

An object of the invention is to manufacture such gels in such manner that they are more suitable for such uses and it is characterized in that alkaline-earth permanganate is used as a compound of the potential-determining cations.

Nitrates and more particularly chlorides, when used in a binder, frequently have troublesome additional effects. Thus, many metals and more particularly iron, have a strong corrosion when in contact with chloride-containing binders. Alkaline-earth chlorides and -nitrates, when heated, produce vapours which are injurious to health. However, it has been found that alkaline-earth permanganates are highly suitable for converting alkaline-earth fluoride dispersions into the gel state. Many metals are not chemically attacked by such permanganates and the formation of rust on iron parts or particles which are in contact therewith is counteracted.

Upon heating of the gel in accordance with the invention, the alkaline-earth permanganates present therein disintegrate without the binding action of the alkaline-earth fluoride being lost and a non-hygroscopic or a lightly hygroscopic product results without the mass contracting to any appreciable extent.

The temperature at which this disintegration may be brought about lies comparatively low. For calcium permanganate, the disintegration temperature is about 145° C.

By mixing the binder according to the invention with a powdered product and giving this mixture a desired shape, followed by heating above the disintegration temperature of the alkaline-earth permanganate used, a dark coloured object is obtained, having a strength and appearance corresponding to those of ceramic, which is water-resistant and properly temperature-resistant. A suitable powdered product is, for example, mineral alkaline-earth fluoride powder, with which an object free from silicate may be manufactured having a high chemical resistance. When choosing the products with which the binder comes into contact, allowance should be made for the oxidative action of permanganate. Many organic products, such as alcohols, are therefore unsuitable for use in accordance with the invention.

As a rule, calcium permanganate has been found most suitable for this use. Barium permanganate yields for many uses insufficient gelation of the alkaline-earth fluoride. Magnesium and strontium permanganate are also suitable for converting alkaline-earth fluoride dispersions into the gel state. However, these permanganates are less stable than calcium permanganate, so that premature disintegration is more liable to occur during the use of the gels.

It has previously been suggested to utilize alkaline-earth fluoride gels as a binder in the manufacture of slagforming masses for use in electric arc welding and more particularly as a coating for welding electrodes, but the use of nitrates as a constituent of such binders has the disadvantage that nitrogen oxides are produced during welding, resulting in many cases in a brittle weld. Chlorides, which are considerably more volatile than fluorides, exhibit the known arc-extinguishhing phenomenon which is also brought about to an increased extent by fluorides, so that welding with alternating current when using a slagforming mass utilizing such binders is difficultly carried out. Furthermore, such slagforming masses are hygroscopic, so that the transport, the storage and the use require precautions which are frequently costly, such as the use of moisturetight packages or heating of the mass directly prior to use. As is well-known, moisture, if retained by the coating, has an unfavourable effect especially upon the quality of a weld obtained with the use of a fluoride-containing slagforming mass.

Since alkaline-earth permanganates, upon moderate heating disintegrate into non-hygroscopic compounds (calcium permanganate changes to manganese dioxide, calcium manganite and oxygen), a non-hygroscopic coating mass is obtained, at least if no use has been made of hygroscopic compounds in biulding up the slagforming mass. This may otherwise readily be avoided.

Suitable slagforming mixtures are composed, for example, of calcium carbonate, silicate and powdery metals and a fluoride gel according to the invention. If desired, they may also contain titanium oxide and quartz and the like.

The silicate of these substances occurs in a slightly hygroscopic state (kaoline, bentonite), which is used in certain cases to give the mass a consistence such that it can readily be moulded.

Suitable mouldability may also be obtained by proportioning the alkaline-earth fluoride gel which also fulfills the function of a binder, so that non-hygroscopic silicates may be used. Slagforming masses free from quartz and silicate may be manufactured, which is important in welding with metal alloys having a tendency during welding to reduce silicates to silicon metal, so that the silicon content of the weld may become impermissibly high.

For the manufacture of the gels, use may be made of either pulverized alkaline-earth fluorides or precipitated fluorides, although the binding and adhering action of precipitated alkaline-earth fluorides is frequently greater. A suitable alkaline-earth fluoride dispersion yielding a concentrated gel after the addition of alkaline-earth permanganate is obtained by adding concentrated hydrofluoric acid to alkaline-earth carbonate powder or alkaline earth hydroxide powder.

The amount of alkaline-earth permanganate used in the gels according to the invention must be in most cases from 10% to 30% of the amount of alkaline-earth fluoride and the amount of water is preferably from ½ to 1½ times or more of the fluoride weight.

Several examples of the invention will now be described hereinafter.

*Example I*

100 gms. of a dry powder consisting of precipitated calcium fluoride is stirred with 100 mls. of a solution of 28.5 gms. of calcium permanganate 5 aq. in water.

After a few minutes, a viscous vaseline-like substance is formed.

*Example II*

A suitable binder according to the invention is also obtained by causing 950 gms. of a 42%-hydrofluoric solution to react upon 1015 gms. of calcium carbonate powder and, while the liquid is still weakly acid only, adding to the resultant mass 142 gm. of calcium permanganate 5 aq. dissolved in 107 mls. of water.

When the suspension is stirred for one hour, a Vaseline-like paste is obtained. The consistency may be adjusted to the value desired by diluting with water.

A similar paste is obtained when 143 gms. of magnesium permanganate 6 aq. dissolved in 110 mls. of water are added instead of a calcium-permanganate solution. Complete gelation then requires, however, a period of time of from 1 to 2 days.

*Example III*

When 190 gms. of calcium carbonate powder have added to it 178 gms. of 42%-hydrofluoric solution and when a solution of 24 gms. of strontium permanganate in 35 mls. of water is caused to react upon the reaction product, followed by stirring for one hour subsequently leaving all untouched for one night, a paste of about similar consistency is obtained.

As an alternative calcium carbonate in these examples may be replaced by strontium and magnesium carbonate, but in this case the magnesium fluoride gel yields less satisfactory results.

*Example IV*

Said substance may be used as a binder by stirring or kneading with powdered minerals, metals and chemicals. Extruding a mixture of 100 gms. of the gel of Example I with 250 gms. of mineral calcium fluoride in the form of a tube and heating at 250° C. results in a tube having the appearance of dark-coloured ceramic and a similar or greater strength which is completely resistant to water, which does not contain silicates and which is heat-resistant to a considerable extent.

*Example V*

In a matrix having an inner section of 32.0 mms., there is moulded a small cylinder from the mass from which the tube of Example IV has also been manufactured. The height of the cylinder was 30.5 mms. The dimensions of the cylinder at room temperature, after drying in air and slow heating to a temperature of 650° C., which was maintained for one hour, had each decreased by only 0.1 mm.

*Example VI*

A suitable slagforming mass is obtained, for example, by kneading 40 gms. of the binder paste with 70 gms. of calcium carbonate in the form of ground calcareous spar, 6 gms. of ferromanganese powder (80% of Mn), 10 gms. of ferrosilicon (45% of Si), 15 gms. of ground quartz and 25 gms. of ground fluorspar.

An iron wire is coated with this mass. The thickness of the wire was 4 mms. and that of the coated wire 6.4 mms. Subsequently, the violet-coloured coating is dried and heated at 350° C. for 1 hour. The colour has then become black-brown.

For comparison purposes, a similar welding electrode was manufactured, in which during the manufacture of the gel the calcium permanganate was replaced by 8.5 gms. of calcium chloride. A third welding electrode was manufactured with the use of 30 gms. of soluble glass solution (34%) and 45 gms. of powdered fluorspar to replace the calcium fluoride gel, whilst only 5 gms. of quartz were used.

The three rods were stored for 4 days in a space, the temperature and the relative humidity of which were maintained at 40° C. and 75%, respectively.

The moisture content (computed at the weight of the coating) was, before the electrodes were introduced into this space, 0.45% for the first electrode and 0.50% for the two other electrodes and, after storage for 4 days in this space, 0.70%, 2.3%, and 2.2% respectively.

The coating of the second welding electrode slightly loosened. This electrode did not permit welding at an open alternating voltage of 80 volts. Welding was difficult with 100 volts of alternating voltage, whilst the arc greatly stammered.

The first electrode, however, still had a firm coating and welding with the use of 80 volts of open alternating voltage did not cause difficulty and resulted in a smooth weld.

The welds obtained with the third electrode were distinctly porous. If the second electrode is manufactured after powdered iron was included in the composition of the coating, this powdered iron exhibited a considerable formation of rust in contradistinction to the electrode manufactured in accordance with the first electrode with the addition of powdered iron to the slagforming mass.

What is claimed is:

1. A process for the manufacture of a binder particularly suitable for binding powdered inorganic material, said binder consisting essentially of a gel of an alkaline earth fluoride comprising the steps, forming an aqueous dispersion of an alkaline earth fluoride and adding about 10% to 30% by weight of said dispersed alkaline earth fluoride of an alkaline earth permanganate to said dispersion.

2. A process for the manufacture of a binder particularly suitable for binding powdered inorganic material, said binder consisting essentially of a gel of an alkaline earth fluoride comprising the steps, forming an aqueous dispersion of a precipitated alkaline earth fluoride and adding about 10% to 30% by weight of said dispersed alakline earth fluoride of an alkaline earth permanganate to said dispersion.

3. A process for the manufacture of a binder particularly suitable for binding powdered inorganic material, said binder consisting essentially of a gel of an alkaline earth fluoride comprising the steps forming an aqueous dispersion of an alkaline earth fluoride by treating a dry alkaline earth compound selected from the group consisting of the alkaline earth hydroxides with a substantially equivalent amount of a concentrated hydrofluoric acid and adding to the resultant dispersion an alkaline earth permanganate in an amount of from about 10% to 30% by weight of said alkaline earth fluoride.

4. A binder particularly suitable for binding powdered inorganic material, said binder consisting essentially of an alkaline earth fluoride gel formed by adding an alkaline earth permanganate to an aqueous dispersion of an alkaline earth fluoride, said alkaline earth permanganate being present in an amount of from about 10% to 30% by weight of the alkaline earth fluoride.

References Cited in the file of this patent

UNITED STATES PATENTS

| | | |
|---|---|---|
| 2,048,174 | Austin | July 21, 1936 |
| 2,141,929 | Moritz | Dec. 27, 1938 |
| 2,154,318 | Benner et al. | Apr. 11, 1939 |
| 2,271,358 | Wilkes et al. | Jan. 27, 1942 |
| 2,308,194 | Miller | Jan. 12, 1943 |
| 2,416,064 | Patterson et al. | Feb. 18, 1947 |
| 2,585,568 | Marshall et al. | Feb. 12, 1952 |
| 2,751,478 | Jackson et al. | June 19, 1956 |
| 2,823,112 | Miller | Feb. 11, 1958 |